Figure 1:
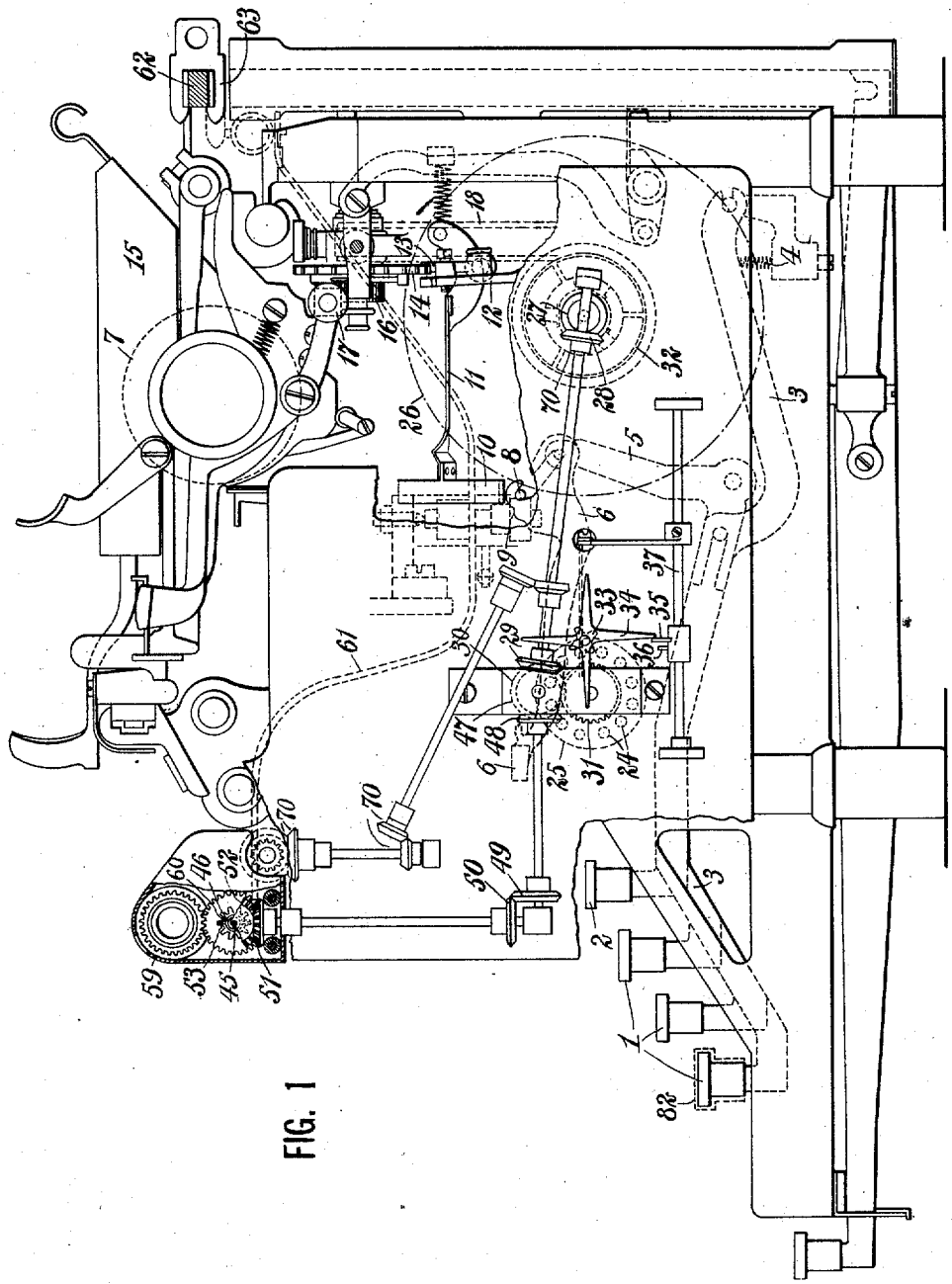

G. O. DEGENER.
COMBINED TYPE WRITING AND COMPUTING MACHINE.
APPLICATION FILED OCT. 3, 1911.

1,208,754.

Patented Dec. 19, 1916.
3 SHEETS—SHEET 1.

WITNESSES:
Paul Zirow.
F. E. Alexander

INVENTOR:
Gustave O Degener
BY B. C. Stickney
ATTORNEY

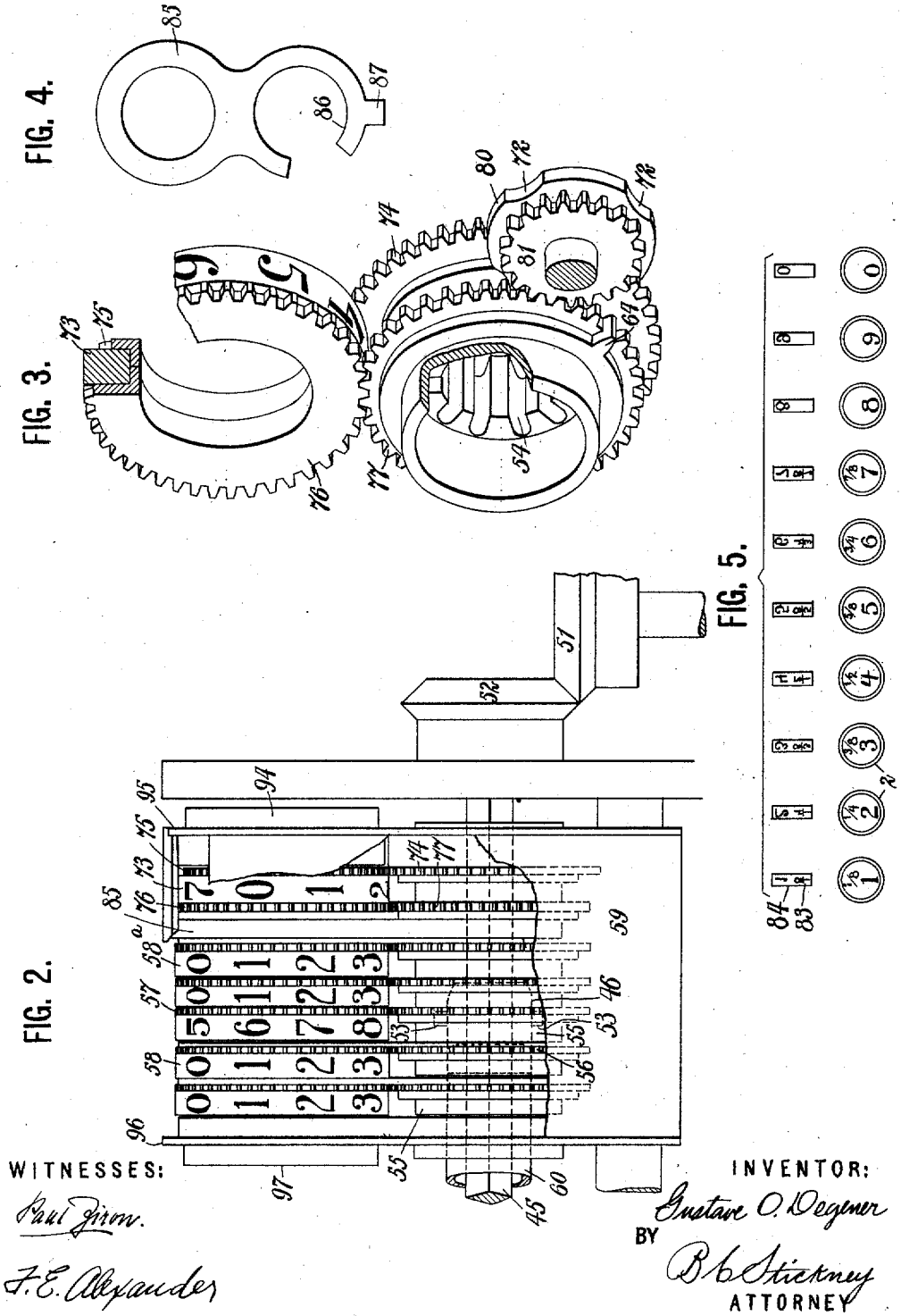

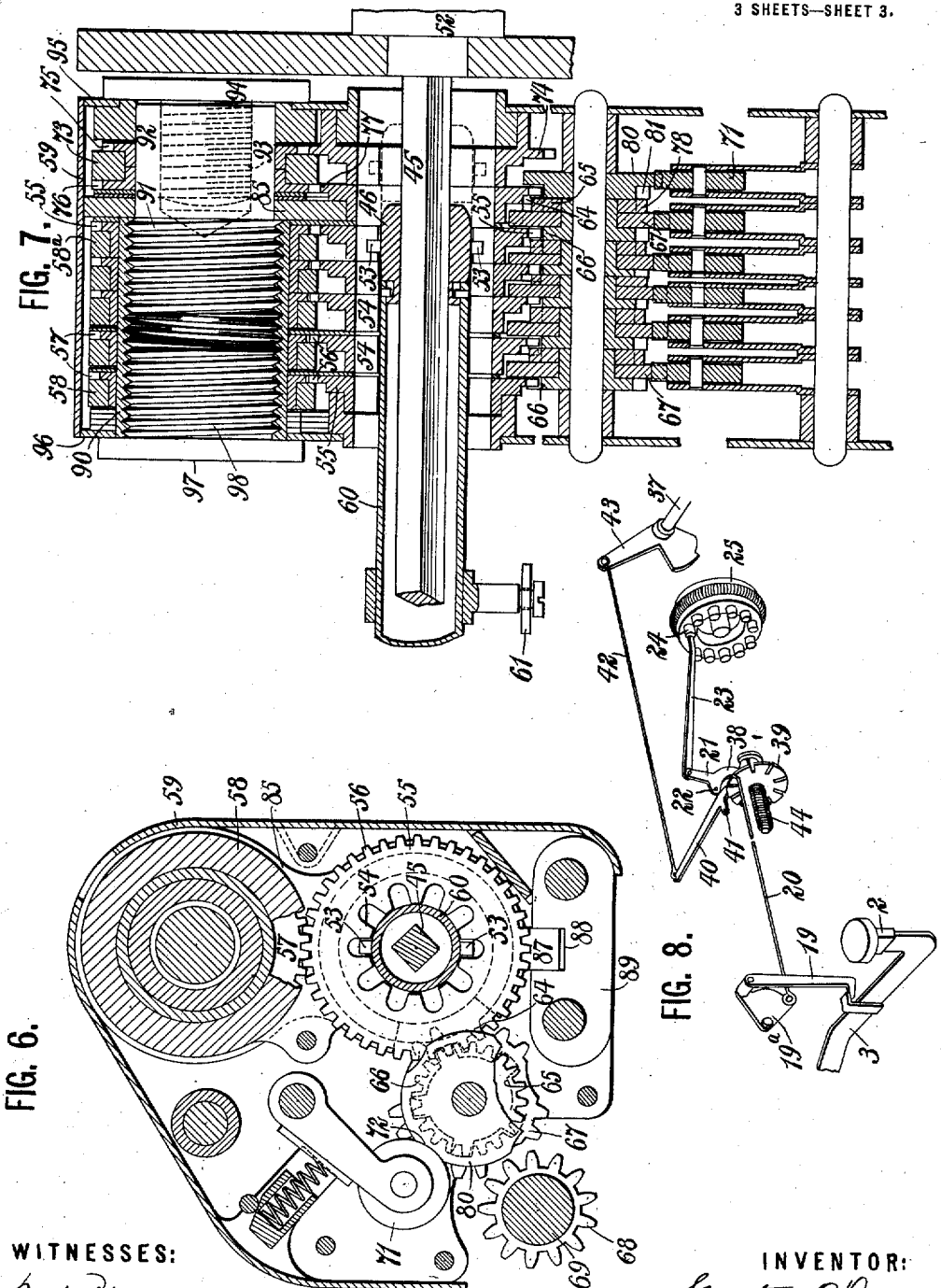

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,208,754.      Specification of Letters Patent.      Patented Dec. 19, 1916.

Application filed October 3, 1911. Serial No. 652,532.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to a fractional computing mechanism in connection with combined typewriting and computing machines of the Underwood type.

It has been found in connection with certain classes of work where goods are measured in fractions of a unit, say eighths, quarters, halves, etc., or where goods are sold at fractions, other than decimal, of a cent or dollar, that a need has sprung up for a computing machine which will take care of a fraction of a unit automatically, and compute it with the whole numbers. If, for example, in a dry goods store it is desired to bill a person for a number of items of cloth involving yards and fractions of a yard, with prices in cents and fractions of a cent, it is desired to have a machine which will automatically take care of the fractions of yards and cents, and give the total in yards, and total cost.

It is therefore an object of this invention to provide mechanism in a combined typewriting and computing machine which will calculate automatically in fractions as well as whole numbers concomitantly with the typewriting.

In the embodiment used to illustrate this invention, a member termed the "master wheel" is given a predetermined rotation at the striking of each numeral key, the extent of which depends on the particular numeral key struck. This master wheel is movable concomitantly with the carriage, which, as usual, advances step-by-step during the striking of the keys, so as to bring the master wheel successively into operation with certain of a series of gears adapted to operate a series of numeral dials through interconnecting gearing. In this type of machine, it has been customary to use dial wheels divided decimally, that is, into ten units from one to ten, or zero which corresponds to ten. One of these dial wheels may be used as the units dial wheel. In this case, there is provided an extra dial wheel adjacent to the units dial wheel which may be termed the "fraction" dial wheel, and is divided into fractional parts other than decimal, and as shown in this case, into eighths, although any other fractional division might be used. The gear which coöperates with this fraction dial wheel is operated also by the master wheel to translate the predetermined rotation of the master wheel at the actuation of certain of the numeral keys. In the case of the decimal dial wheels, the ratio between the gears operated by the master wheel and the gears carried by the decimal dial wheel is one. It is necessary however to have, in connection with the gear operated by the master wheel and the gear carried by the fraction dial wheel, a ratio other than one, according to the division of the fraction dial wheel. In this case, the ratio is ten to eight, inasmuch as the fraction dial wheel is divided into eight parts corresponding to eighths of a unit. That is to say, the fraction dial wheel will be rotated a complete rotation when the master wheel and the gear operating the fraction dial have rotated but eight-tenths of a revolution. It is of course necessary that a complete rotation of the fraction dial wheel be carried up to the units wheel, so as to cause a tenth of a rotation thereof. This is accomplished by providing a train of gearing with a ratio of one from the fraction dial wheel, one of which gears is provided with a special tooth adapted to bring in operation a mutilated gear, which, when brought in play, may be actuated by a constantly rotated gear so as to rotate the units dial one-tenth of a revolution through the intermediary of connecting gearing. It so happens that the gear carrying the special tooth is located in alinement with the gears operated directly by the master wheel and is therefore provided with a central opening to permit the passage of the master wheel and yet is free from internal teeth so as to be independent of operation by the master wheel.

Inasmuch as the gears operated by the master wheel are usually supported by the internal teeth engaging the arbor of the master wheel, it is desirable to support this extra gear bearing the special tooth in some other way, which is accomplished by providing a partition connected to a stem which supports certain of the dial wheels and having an opening which forms a bearing for the hub of this special gear. In order that this special gear and the fraction dial wheel connected thereto may not accidentally rotate, there is provided an extra gear meshing therewith, which has a wheel with quadrantly disposed indentations into which a detent may engage at the proper instants.

A feature to be noted is that the same keys are used both for whole numbers and vulgar fractions, of course with the intervention of a shift key to change from whole numbers to vulgar fractions, and vice versa. It will be seen that the whole number indicates the numerator of each fraction, of which, the number of parts into which the fraction dial wheel is divided is the denominator. This permits the use of any number of the numeral keys for the purpose of calculating both whole number and vulgar fractions merely requiring a change in ratio between the master wheel driven gear and the gear carried by the fraction dial with the change in the type on the type bar.

Other features and advantages will hereinafter appear.

Referring to the drawings, Figure 1 is a side view in elevation with parts removed and broken away to simplify the showing and show the underlying structure. Fig. 2 is a fragmentary front view in elevation of the computing head with the casing broken away to show the mechanism beneath the same. Fig. 3 is a fragmentary perspective view of the fraction dial wheel, with the master wheel operated gear operating a certain part of the gearing for carrying over a complete rotation of the fraction dial wheel. Fig. 4 is a detail view of the partition for supporting the special carrying gear. Fig. 5 is a diagrammatic view, showing the relation of the keys to their respective type blocks. Fig. 6 is a detail vertical section of the computing head taken through the fraction dial. Fig. 7 is a section taken at right angles to the section in Fig. 6. Fig. 8 is a detail perspective view of the key-controlled mechanism for operating the controlling mechanism which determines the extent of rotation of the master wheel according to the particular numeral key struck.

In the Underwood combined typewriting and adding machine, letter keys 1 and figure keys 2 depress levers 3 having returning springs 4, and connected, by means of bell cranks 5, to type bars 6, which are swung up to strike against the front face of a platen 7. The type bars are pivoted upon a fulcrum wire 8 and have heels 9 to press rearwardly a universal bar 10, which is mounted on a frame 11 to operate dogs 12, 13, which coöperate with an escapement wheel 14 connected with a pinion 16 to mesh with a rack 17 upon a carriage 15 which carries said platen 7; the carriage being driven by a spring barrel 18. Each figure key 2 is also connected by a hook 19, a lever 19$^a$, and a link 20, (Fig. 8), to a lever 21 pivoted at 22 and forming one of a series of levers grouped radially, and each carrying a jack 23 to displace or set up computing pins 24 in a power-driven wheel 25. This wheel is driven by a constantly rotating motor 26, connected by gears 27, 28, 29, 30 and 31, to said wheel 25, and tending constantly to turn the latter; a friction clutch 32 being interposed between the motor and the wheel 25. The pins 24, when projected, are restrained by a four toothed pinion 33, which is engageable by the pins and fixed to an escapement wheel 34, Fig. 1, which is controlled by dogs 35, 36, fixed upon a rock shaft 37, which is also controlled by the figure keys 2; each of the levers 21 having an arm 38 to bear against a disk 39, which is connected to a lever 40 having a pivot between its ends at 41, and connected by a link 42 to an arm 43 fixed upon rock shaft 37.

When any key 2 is depressed, it rocks the shaft 37 in one direction, allowing the teeth of wheel 34 to slip off from the dog 35 onto the dog 36; and when the key returns, the shaft is rocked in the other direction by means of spring 44, Fig. 8, thereby enabling the escapement wheel 34 to slip off of the dog 36, so that the pin carrying wheel 25 is permitted to rotate until the next projected pin thereon comes into engagement with the pinion 33. After each pin is used, it is restored to normal position by suitable means, not shown.

To the pin carrying wheel 25, is connected a shaft 45 of a master wheel 46; the connection including gears 47, 48, 49, 50, 51 and 52, the latter fixed upon the shaft 45, to which the master wheel 46 is splined. The master wheel has opposite teeth 53 to engage internal gears 54, Fig. 7, formed upon computing wheels 55, the latter having gears 56 meshing with gears 57 provided upon dial wheels 58.

The rotative movement of the pin carrying wheel 25 is transmissible to any of the dial wheels. These dial wheels are mounted in a casing 59 which is secured upon the framework of the machine. The master wheel 46 is connected to a tubular arbor 60, which is connected to the carriage 15 of the typewriter, to move step-by-step therewith; the connection comprising a lever 61 pivoted midway between its ends, and connected at its forward end to said tube 60, and at its rear end to a bar 62 which is connected to the carriage (or to a lug 63 on said bar). The master wheel 46 travels to the right, Fig. 7, as the carriage 15 travels in letter feeding direction to the left; the writing and adding proceeding from higher to lower denomination.

Upon each of the computing wheels 55, is a special tens-carrying tooth 64, which once in each revolution engages and rotates a five toothed pinion 65, fixed to which is an ordinary pinion 66 meshing with the gear 56 of next higher denomination, whereby tens are carried upon the latter.

To assist at the tens-carrying operation, there is provided a multilated assisting gear 67 which comprises five sets of teeth at equal intervals. The mutilated gear 67 which is fixed to the pinions 66 and 65, is arranged to be engaged by one of a series of constantly rotating pinions 68, which are fixed upon a shaft 69, the latter being connected to the constantly rotating motor 66 by means of a train of gearing designated generally as 70. The special tooth 64 on the computing wheel 55 rotates the multilated gear 67 enough to engage it with the constantly rotating pinion 68; the latter thereupon drives the mutilated gear, with its two connected pinions, until the tens-carrying operation is substantially completed; a spring detent 71 snapping into a seat 72, of which five are provided upon the mutilated gear 67.

A fraction dial wheel 73 is preferably divided into eight parts, and is connected to turn as many eighths of a revolution as the master wheel turns tenths of a revolution, so that when the master wheel has traveled into engagement with the fraction mechanism, operation of any of the numeral keys 2 will cause the fraction dial wheel to rotate a corresponding number of eighths. For instance, if the numeral "3" is struck, the dial wheel will turn three-eighths of a revolution; if "4" is struck, the dial wheel will turn one-half of a revolution. The mechanism which enables the master wheel to do this includes a special computing wheel 74, Fig. 3, and a special gear 75 in mesh therewith, and fixed to the fraction dial wheel 73; the diameters of said gears being in proportion of ten to eight, so that with every tenth of a revolution of 74, there occurs one-eighth of a revolution of 75 and 73; it being designed to turn the fraction dial 73 eight steps for each revolution.

For driving the units wheel 58ª one step at the completion of each revolution of the fraction wheel 73, a gear 76 is fixed to the wheel and meshes with a gear 77 similar to 55, but wholly unprovided with an internal gear key 54. This gear 77 is of the same diameter as 76, and carries a special tooth 64 to engage the pinion 65 fixed to that pinion 66, which meshes with the units gear 55; said pinion 66 being provided with an assisting mutilated gear or pinion 67.

The detent roll 71 for the fraction dial wheel 73 engages a special wheel 80 similar to 66, but having no teeth, and provided with four peripheral depressions or seats 72 for its detent roll 71. A pinion 81 fixed to the wheel 80, meshes with the gear 77, and hence controls the dial wheel 73.

It will be seen that when the master wheel 46, 53, is in mesh with the fraction gear 74, as shown in dotted lines at Fig. 7, the turning of the master wheel shaft 45 through one-tenth of a revolution, will rotate the wheel 74 the same distance, thereby turning the wheel 75 through one-eighth of a revolution, together with the dial wheel 73 and the gear 76 thereon; the gear 77 turning the same distance, and the wheel 80 turning one-fourth of a revolution, so that the detent 71 will fall into the next seat 72 on the wheel 80. Whenever the special tooth 64 on the wheel 77 operates the five toothed pinion 65, the mutilated pinion 67 is rotated into engagement with the constantly revolving pinion 68, and thereby the rotation of the mutilated pinion 67 is completed through one-fifth of a revolution, together with the pinion 66 secured thereto, thereby turning the units wheel 58ª one-tenth of a revolution.

At Fig. 5, there are shown in the upper row the figure types, and in the lower row the figure keys which operate the same. It will be understood that when writing fractions, the usual shift key 82 is first depressed, so that the upper case types 83 on the type blocks 84, will be printed on the paper. At the same time, the master wheel must be in engagement with the fraction wheel 74, as shown in dotted lines at Fig. 7. The type blocks for "8," "9" and "0" need not be provided with upper case characters, although this is immaterial.

Rigidly secured to the casing 59 is a partition 85, Figs. 4 and 7, having in its lower portion a bearing 86 for the hub of the wheel 77, and also having a tenon 87 to engage a mortise 88 in a base 89, upon which the casing is secured. The dial wheels 58 turn upon a tube 90, interiorly threaded throughout its length. A screw 91, having a reduced stem 92, is threaded into the inner part of said tube 90; and a screw 93 has a head 94 to bear upon one end 95 of the casing, to draw the tube 90 tightly against the partition 85; the reduced stem or shank 92 of said screw 91 serving as a shaft upon which the wheels 75, 76 rotate. The opposite head 96 of the casing is held in place by the head 97 of the screw 98 threaded into the outer end of the tube 90.

The dial wheel 73 may be of any suitable width, and may be marked with appropriate fractions in place of digits. Other variations may be resorted to within the scope of the invention, and portions of the improvements may be used without others.

Having thus described my invention, I claim:

1. The combination with a dial wheel, of a master wheel, and a gear comprising internal teeth operable by said master wheel, a gear connected with said dial wheel and meshing with said first-mentioned gear, said gears being of different diameters.

2. The combination with a dial wheel, of a master wheel, a gear operable by said master wheel, a gear connected with said dial wheel and meshing with said first-mentioned gear, another gear carried by said dial wheel, and a gear of equal diameter to said last gear and meshing therewith.

3. The combination with a dial wheel, of a master wheel, a gear operable by said master wheel, a gear connected with said dial wheel and meshing with said first-mentioned gear, said gears being of different diameters, another gear carried by said dial wheel, and a gear of equal diameter to said last-mentioned gear meshing therewith and arranged beside said first-mentioned gear.

4. The combination with a dial wheel, of a master wheel, a gear operable by said master wheel, a gear connected with said dial wheel and meshing with said first-mentioned gear, said gears being of different diameters, another gear carried by said dial wheel, a gear of equal diameter to said last-mentioned gear meshing therewith and arranged beside said first-mentioned gear, a wheel carried by said last-mentioned gear having quadrantly disposed depressions thereon, and a detent adapted to engage said depressions to hold said dial wheel against accidental movement.

5. The combination with a units dial wheel, of a fraction dial wheel, a master wheel, a gear operable by said fraction dial wheel and independent of operation by said master wheel, a gear operable by said master wheel for operating said units wheel, and means for causing a concomitant motion of said second mentioned gear at a certain motion of said first mentioned gear.

6. The combination with a units dial wheel, of a fraction dial wheel, a master wheel, a gear operable by said fraction dial wheel and independent of operation by said master wheel, a gear operable by said master wheel for operating said units wheel, a special tooth carried by said first-mentioned gear, a third gear operable by said tooth, a fourth gear meshing with said second-mentioned gear, and means brought in play by a movement of said third-mentioned gear for rotating said fourth-mentioned gear.

7. The combination with a units dial wheel, of a fraction dial wheel, a master wheel, a gear operable by said fraction dial wheel and independent of operation by said master wheel, a gear operable by said master wheel for operating said units wheel, a special tooth carried by said first-mentioned gear, a third gear operable by said tooth, a fourth gear meshing with said second-mentioned gear, a mutilated gear connected to said third and fourth mentioned gears, and a rotating member brought into engagement with said mutilated gear to move said second gear and said dial wheel by a movement of said first and third mentioned gears.

8. The combination with a units dial wheel, of a fraction dial wheel, a master wheel, a gear operable by said fraction dial wheel and independent of operation by said master wheel, a gear operable by said master wheel for operating said units wheel, a special tooth carried by said first-mentioned gear, a third gear operable by said tooth, a fourth gear meshing with said second-mentioned gear, a mutilated gear connected to said third and fourth mentioned gears, a rotating member brought into engagement with said mutilated gear to move said second gear and said dial wheel by a movement of said first and third mentioned gears, and a detent for holding certain of said gears against accidental movement.

9. The combination with a units dial wheel, of a fraction dial wheel, a master wheel, a gear operable by said fraction dial wheel and independent of operation by said master wheel, a gear operable by said master wheel for operating said units wheel, a special tooth carried by said first-mentioned gear, a third gear operable by said tooth, a fourth gear meshing with said second-mentioned gear, a mutilated gear connected to said third and fourth mentioned gears, a rotating member brought into engagement with said mutilated gear to move said second gear and said dial wheel by a movement of said first and third mentioned gears, and a detent for holding certain of said gears against accidental movement; said mutilated gear having depressions intermediate the teeth thereon engageable by said detent.

10. The combination with a dial wheel, of a pair of gears secured to said dial wheel so as to rotate therewith, a gear meshing with one of said gears to drive said dial wheel, a master wheel connectible to said last-mentioned gear, so as to rotate the same, a fourth gear driven by the other of said gears connected to said dial wheel and having a special tooth thereon, a units dial wheel, a gear drivable by said master wheel for rotating said units dial wheel, and means brought in play by said special tooth for carrying a complete rotation of said fraction dial wheel to said units dial wheel through the intermediary of said gear driving said units dial wheel.

11. The combination with a plurality of dial wheels, of means for supporting said dial wheels, another dial wheel, a stem projecting from said wheels for supporting said last-mentioned dial wheel, a gear operatively connected to said last-mentioned dial wheel, and a partition mounted on said stem for supporting said gear.

12. The combination with a plurality of dial wheels, of means for supporting said dial wheels, another dial wheel, a stem projecting from said wheels for supporting said last-mentioned dial wheel, a gear operatively connected to said last-mentioned dial wheel, and a partition mounted on said stem for supporting said gear; said partition having a tenon thereon and a base engaging said tenon to support said partition.

13. The combination with a tube, of a series of dial wheels mounted on said tube, a stem projecting from one side of said tube, a dial wheel mounted on said stem, a partition having an opening therein mounted on said stem, and a gear operable by said dial wheel having a slot extending in an opening in said partition, so that said gear may be supported by said partition.

14. The combination with a tube, said tube being screw-threaded, of a screw engaging said tube and having a stem projecting from one side thereof, dial wheels mounted on said tube, a dial wheel mounted on said stem, a screw having a head mounted in said stem, and a screw having a head mounted in said tube.

15. The combination with a tube, said tube being screw-threaded, of a screw engaging said tube and having a stem projecting from one side thereof, dial wheels mounted on said tube, a dial wheel mounted on said stem, a screw having a head mounted in said stem, a screw having a head mounted in said tube, a gear wheel operable by said last mentioned dial wheel, a partition having a plurality of openings therein through one of which extends said stem, a portion of said gear extending through the other of said openings, so that said partition supports said gear, and a base for concomitantly securing said partition.

16. The combination with a plurality of gears having central openings, of a master wheel movable through said openings, certain of said gears having inwardly projecting teeth adapted to engage said master wheel, an arbor connected to said master wheel and movable therewith through said gears, one of said gears being devoid of internal teeth, and a partition having an opening therein forming a bearing through which a portion of said last-mentioned gear extends so as to support said last-mentioned gear.

17. The combination with a typewriting mechanism including numeral keys and type bars, certain of said numeral keys and type bars being adapted to cause the printing of both whole numbers and fractions, a master wheel, means for imparting to said master wheel a definite rotation for each key, whether operating to print a fraction or a whole number, a series of dial wheels, and computing wheels comprising internal teeth arranged to be engaged by said master wheel, and said external teeth engaged by said dial wheels for actuating certain of said dial wheels to calculate in whole numbers when said type bars print whole numbers, and also actuating certain of said dial wheels to calculate in fractions when said type bars print fractions.

18. The combination with a dial wheel, of a master wheel, and a gear operable by said master wheel, a gear connected with said dial wheel and meshing with said first-mentioned gear, said gears being true, natural, and of different diameters.

19. In a computing machine, the combination with a master actuator, of a dial wheel comprising numerals to one base, a dial wheel comprising numerals to another base, a gear on each dial wheel, a driving wheel meshing with each of said dial wheel gears arranged to be engaged *seriatim* by said master actuator, a carry-over device for the first-named dial wheel operated by its driving wheel, and an idle gear meshing with the dial wheel to said second base operating a carry-over mechanism for said second-named dial wheel.

20. In a computing machine, the combination with a dial wheel to one base, of a dial wheel to another base, a gear wheel meshing with a gear on said first dial wheel, a gear having a different number of teeth meshing with a gear on said second dial wheel, a carry-over device operated by said first-mentioned gear, an idle gear driven by said second dial wheel, and a carry-over device operated by said second gear to carry a number into the first dial wheel.

21. In a computing machine, the combination with a dial wheel to one base, of a dial wheel to a second base, a driving wheel meshing with said first dial wheel, a driving wheel meshing with said second dial wheel having a different number of teeth, a master actuator for engaging said driving wheels *seriatim*, an idle gear driven by the second dial wheel, a carry-over mechanism driven by said idle wheel arranged to carry into said first-named dial wheel, and a carry-over device for said first-named dial wheel driven by the driving wheel thereof.

22. In a computing machine, the combination with a dial wheel to one base, of a dial wheel to a second base, a driving wheel meshing with said first dial wheel, a driving wheel having a different number of teeth meshing with said second dial wheel, an actuator arranged to engage said driving wheels *seriatim*, an idle wheel meshing with a gear on said dial wheel to the second base, an alining and carrying device operated by said idle gear, and an alining and carrying device for said first dial wheel operated by the driving wheel meshing therewith.

23. In a computing machine, the combination with a dial wheel to one base, of a dial wheel to another base, a driving wheel for said first dial wheel, a driving wheel having a different number of teeth for said second dial wheel, other teeth on each of said driving wheels identical in number on the two wheels, an actuator arranged to engage said driving wheels by their teeth identical in number, an idle wheel driven by the dial wheel on said second base, a carry-over mechanism driven by said idle wheel, and a carry-over mechanism driven by the driving wheel of said dial wheel to the first base.

24. In a computing machine, the combination with a dial wheel to one base, of a dial wheel to another base, a driving wheel for said first dial wheel, a driving wheel for said second dial wheel having a different number of teeth, an idle wheel formed as a sleeve on said second driving wheel, a carry-over mechanism for said second dial wheel operated by said idle sleeve, and a carry-over mechanism for the first dial wheel operated by its driving wheel.

25. The combination with a decimal dial wheel, of an ultra-decimal dial wheel arranged adjacent said decimal dial wheel so as to be of the next lower order, a computing wheel for said decimal dial wheel, a computing wheel for said ultra-decimal dial wheel, a master wheel for rotating said computing wheels successively and decimally, a train of gearing between said decimal dial wheel and its computing wheel, a train of gearing between said ultra-decimal dial wheel and its computing wheel, a supplementary computing wheel intermediate said first-mentioned computing wheels, a train of gearing between said ultra-decimal dial wheel and said supplementary computing wheel, and a carry-over mechanism for transmitting complete rotations of said ultra-decimal dial wheel to said decimal dial wheel through the intermediary of said supplementary computing wheel.

26. The combination with a decimal dial wheel, of an ultra-decimal dial wheel arranged adjacent said decimal dial wheel so as to be of the next lower order, a computing wheel for said decimal dial wheel, a computing wheel for said ultra-decimal dial wheel, a master wheel for rotating said computing wheels successively and decimally, a train of gearing between said decimal dial wheel and its computing wheel, a train of gearing between said ultra-decimal dial wheel and its computing wheel, a supplementary computing wheel intermediate said first-mentioned computing wheels, a train of gearing between said ultra-decimal dial wheel and said supplementary computing wheel, and a carry-over mechanism for transmitting complete rotations of said ultra-decimal dial wheel to said demical dial wheel through the intermediary of said supplementary computing wheel, said supplementary computing wheel being free from subservience to said master wheel so as to be silent as to computing.

27. The combination with a pair of adjacent dial wheels, of a computing wheel for rotating each of said dial wheels, a master wheel for driving said computing wheels *seriatim*, a partition located between and separating said dial wheels, and an idle computing wheel interposed between said first-mentioned computing wheels and formed to be beyond the reach of said master wheel, so as to be unaffected thereby.

28. The combination with a pair of adjacent dial wheels, of an active computing wheel for driving each of said dial wheels, master actuating mechanism for driving said computing wheels *seriatim*, said computing wheels having means to engage said master actuating mechanism both to be driven thereby and to be supported thereby when not driven, an idle computing wheel interposed between said active computing wheels, and a special support for said idle computing wheel for holding said idle computing wheel in place independently of said master actuating mechanism.

29. The combination with a series of dial wheels, some of which have numbers thereon to compute decimally and others of which have numbers thereon to compute ultra-decimally, of a series of computing wheels, a decimal train of gearing between said computing wheels and such of said dial wheels as are to compute decimally, and an ultra-decimal train of gearing between said computing wheels and such of said dial wheels as are to compute ultra-decimally, said last-mentioned train of gearing having a fixed driving ratio, the gears of which, however, differ in diameter with respect to the corresponding gears of the first-mentioned train.

30. The combination with a series of dial wheels, some of which have numbers thereon to compute decimally and others of which have numbers thereon to compute ultra-decimally, of a series of computing wheels, a decimal train of gearing between said computing wheels and such of said dial wheels as are to compute decimally, and an ultra-decimal train of gearing between said computing wheels and such of said dial wheels as are to compute ultra-decimally, said last-mentioned train of gearing having a fixed driving ratio, the gears of which, however, differ in diameter with respect to the corresponding gears of the first-mentioned train, all of the gears of said trains being perfect natural gears with true pitches, diameters, and numbers of teeth for the driving ratios of the trains, and all meshing gears having the same pitch so as to drive accurately.

31. The combination with a series of dial wheels, decimal and ultra-decimal, for successive denominations or orders, of a series of coaxial gears for driving said dial wheels, varying in diameter according to the driving ratio to drive the associated dial wheels decimally or ultra-decimally, a series of receiving gears of the same diameter whether associated with decimal or ultra-decimal dial wheels, a master wheel for driving said coaxial gears *seriatim*, said first-mentioned series of gears and said receiving gears being paired, one pair for each dial wheel, and the pairs being joined to rotate in unison, said receiving gears being of a size and form to admit of the uninterrupted engagement of said master wheel therewith in succession irrespective of the relative sizes of the associated first-mentioned gears which vary according to the character of the order which they are in, that is, whether decimal or ultra-decimal.

32. The combination with a series of dial wheels having external gear teeth and marked off in figures arranged from one to ten, of a fraction dial wheel having external gear teeth, which form a gear of smaller diameter than the gears of said first-mentioned dial wheels, and marked off in units between one and some limit less than ten, computing wheels having external teeth for actuating said dial wheels individually, the teeth of the computing wheel actuating said fraction dial wheel forming a gear of greater diameter than that of the other wheels, a master wheel within said computing wheels engaging them *seriatim* by internal teeth thereon, and means for carrying a complete rotation of said fraction wheel to the next adjacent dial wheel, so as to cause a tenth of a revolution of said next adjacent dial wheel.

33. The combination with a series of separate computing wheels mounted to rotate about the same axis, of a master wheel for driving most of said computing wheels *seriatim* when in register therewith, and gearing connections to certain of said computing wheels enabling the drive of such computing wheels with said master wheel when out of register therewith.

34. The combination with a series of decimal dial wheels having external gear teeth and inscribed at equal distances with the ten digits from one to naught, corresponding to one to ten, of an ultra-decimal dial wheel having external gear teeth which form a gear of different diameter than the gears of said first-mentioned dial wheels, and marked off into units between one and some other limit other than ten, computing wheels having external teeth for actuating said dial wheels individually, the teeth of the computing wheels actuating said ultra-decimal dial wheel forming a gear of different diameter than that of said other wheels, a master wheel within said computing wheels engaging them *seriatim* by internal teeth thereon, and means for carrying a complete rotation of said ultra-decimal dial wheel to the next adjacent dial wheel so as to cause a decimal fraction of a revolution of said next adjacent dial wheel.

35. The combination with a series of computing wheels rotating about a common axis, of a master wheel and its shaft extending through said computing wheels to drive certain of said computing wheels *seriatim*, certain of which computing wheels are provided with internal teeth to mesh with said master wheel so as to be driven thereby and also acting to engage said shaft to support said computing wheels, certain others of said computing wheels having enlarged internal openings so as to be clear of said master wheel and said shaft, and a separate support for such of said computing wheels as are clear of said master wheel and said shaft.

36. The combination with a plurality of primary computing wheels, of a series of dial wheels of mixed character, some decimal and some ultra decimal, a step-by-step traveling master wheel for driving said computing wheels so as to drive said dial wheels *seriatim*, driving gears on said computing wheels engaging driving gears on said dial wheels to enable the drive of said dial wheels from said computing wheels, and individual gears on said computing wheels of different diameter than said first-mentioned gears on said computing wheels for forming a line of drive or contact with said master wheel out of register with the pitch circles of said first-mentioned gears on said computing wheels, so that the master wheel in its travel will be free from interference therefrom, irrespective of the relative magnitudes of said first-mentioned gears.

37. The combination with a series of dial wheels of mixed character, some decimal and others ultra decimal, of gears on said dial wheels to enable the driving thereof, a series of computing wheels having a common axis of rotation, gears on said computing wheels meshing with said first-mentioned gears to drive the same and to be driven thereby for carry-over operations, said last-mentioned gears varying in relative ratio so as to enable the decimal and ultra-decimal computing actions, carry-over gears meshing with said last-mentioned gears acting each from one computing wheel to the next higher computing wheel, a master wheel having a relative step-by-step movement with respect to said computing wheels so as to drive said dial wheels *seriatim*, and a second series of gears on said computing wheels having uniform pitch circles of different magnitudes however from the pitch circles of said previously mentioned gears on said computing wheels, so as to form a uniform line of drive, irrespective of the variations in the pitch circles of the previously mentioned gears on said computing wheels.

GUSTAVE O. DEGENER.

Witnesses:
J. E. LUCAS,
L. D. BAYLIS.

Copies of this patent may be obtained for five cents each, by addressing the "Commissioner of Patents, Washington, D. C."